US011736135B2

(12) United States Patent
Shaw

(10) Patent No.: US 11,736,135 B2
(45) Date of Patent: Aug. 22, 2023

(54) ACCESSORY FOR ELECTRONIC DEVICE

(71) Applicant: Julian Shaw, Henderson, NV (US)

(72) Inventor: Julian Shaw, Henderson, NV (US)

(*) Notice: Subject to any disclaimer, the term of this patent is extended or adjusted under 35 U.S.C. 154(b) by 0 days.

(21) Appl. No.: 17/647,719

(22) Filed: Jan. 11, 2022

(65) Prior Publication Data

US 2022/0286156 A1 Sep. 8, 2022

Related U.S. Application Data

(60) Provisional application No. 63/155,660, filed on Mar. 2, 2021.

(51) Int. Cl.
*H04B 1/3877* (2015.01)
*H04M 1/04* (2006.01)

(52) U.S. Cl.
CPC .......... *H04B 1/3877* (2013.01); *H04M 1/04* (2013.01)

(58) Field of Classification Search
CPC ............................. H04B 1/3877; H04M 1/04
See application file for complete search history.

(56) References Cited

U.S. PATENT DOCUMENTS

| | | | | |
|---|---|---|---|---|
| 6,129,237 A * | 10/2000 | Miyahara | ............ | G06F 1/1626 220/255 |
| 7,001,088 B2 * | 2/2006 | Hui-hu | ............ | G06F 3/0208 400/681 |
| 8,162,283 B1 * | 4/2012 | Royz | ............ | F16M 11/10 248/455 |
| 8,960,634 B2 * | 2/2015 | Le Gette | ............ | B65H 75/4476 248/176.1 |
| 8,983,559 B2 * | 3/2015 | Chiu | ............ | H04M 1/185 455/575.8 |
| 9,131,756 B2 * | 9/2015 | Hurst | ............ | A45C 11/00 |
| 9,372,507 B2 * | 6/2016 | Dekock | ............ | G06F 1/1626 |
| 9,717,314 B2 * | 8/2017 | Idehara | ............ | G06F 1/1626 |
| 9,838,519 B1 * | 12/2017 | Blackwood | ............ | H04M 1/0281 |
| 9,958,906 B2 * | 5/2018 | Ho | ............ | G06F 1/166 |
| 10,790,869 B1 * | 9/2020 | Loh | ............ | A45C 11/00 |
| 10,855,821 B1 * | 12/2020 | Chou | ............ | H04B 1/3877 |
| 11,632,141 B1 * | 4/2023 | Weng | ............ | H04B 1/3888 455/575.8 |
| 2003/0089832 A1 * | 5/2003 | Gold | ............ | G06F 1/1632 248/454 |
| 2005/0254875 A1 * | 11/2005 | Hui-hu | ............ | G06F 3/0208 400/472 |

(Continued)

*Primary Examiner* — Jinsong Hu
*Assistant Examiner* — Rui M Hu
(74) *Attorney, Agent, or Firm* — Levine Bagade Han LLP

(57) ABSTRACT

An accessory for use with a mobile device is provided. The accessory may include a first pivot plate, a second pivot plate, a sliding plate, and a frame enclosing the plates. The first pivot plate may be coupled to the second pivot plate at a first hinge. The sliding plate may be coupled to the second pivot plate at a second hinge. The second pivot plate may have a nub at the first hinge configured to accommodate a finger of a user. The accessory may have an undeployed configuration and a deployed configuration in which the sliding plate is translated along the frame such that the first pivot plate and the second pivot plate flex outwardly from the frame. In the deployed configuration, a portion of the first pivot plate may sit within a portion of the second pivot plate at the first hinge.

9 Claims, 11 Drawing Sheets

(56) References Cited

U.S. PATENT DOCUMENTS

| | | | |
|---|---|---|---|
| 2010/0051775 A1* | 3/2010 | Wu | F16M 11/10 248/371 |
| 2011/0031287 A1* | 2/2011 | Le Gette | F16M 11/2021 248/65 |
| 2011/0050063 A1* | 3/2011 | Wang | H04N 1/00127 248/351 |
| 2011/0165914 A1* | 7/2011 | Guo | H04M 1/0237 455/566 |
| 2011/0279959 A1* | 11/2011 | Lopez | A45F 5/00 361/679.03 |
| 2012/0106054 A1* | 5/2012 | Royz | F16M 11/10 248/688 |
| 2012/0199501 A1* | 8/2012 | Le Gette | F16M 11/10 206/45.24 |
| 2012/0199622 A1* | 8/2012 | Palmer | A47B 23/002 108/41 |
| 2013/0277237 A1* | 10/2013 | Wang | A45C 11/00 206/45.2 |
| 2014/0262854 A1* | 9/2014 | Chen | F16M 11/10 206/45.24 |
| 2014/0332418 A1* | 11/2014 | Cheung | H04B 1/3877 206/45.2 |
| 2015/0245519 A1* | 8/2015 | Forristall | H04B 1/3877 320/103 |
| 2015/0375894 A1* | 12/2015 | Idehara | A45C 11/00 206/45.24 |
| 2016/0069512 A1* | 3/2016 | Grieve | A45F 5/00 294/142 |
| 2016/0183652 A1* | 6/2016 | Erlandsen Strange | H04M 1/04 220/756 |
| 2016/0273702 A1* | 9/2016 | Shiba | F16M 13/005 |
| 2020/0028951 A1* | 1/2020 | Hummel | H04M 1/04 |
| 2020/0344343 A1* | 10/2020 | Tsitron | G06F 1/1628 |
| 2020/0389548 A1* | 12/2020 | Thormaehfen | H04M 1/04 |
| 2021/0084132 A1* | 3/2021 | Chou | G06F 1/1681 |
| 2022/0094379 A1* | 3/2022 | Balderston | H04B 1/385 |

\* cited by examiner

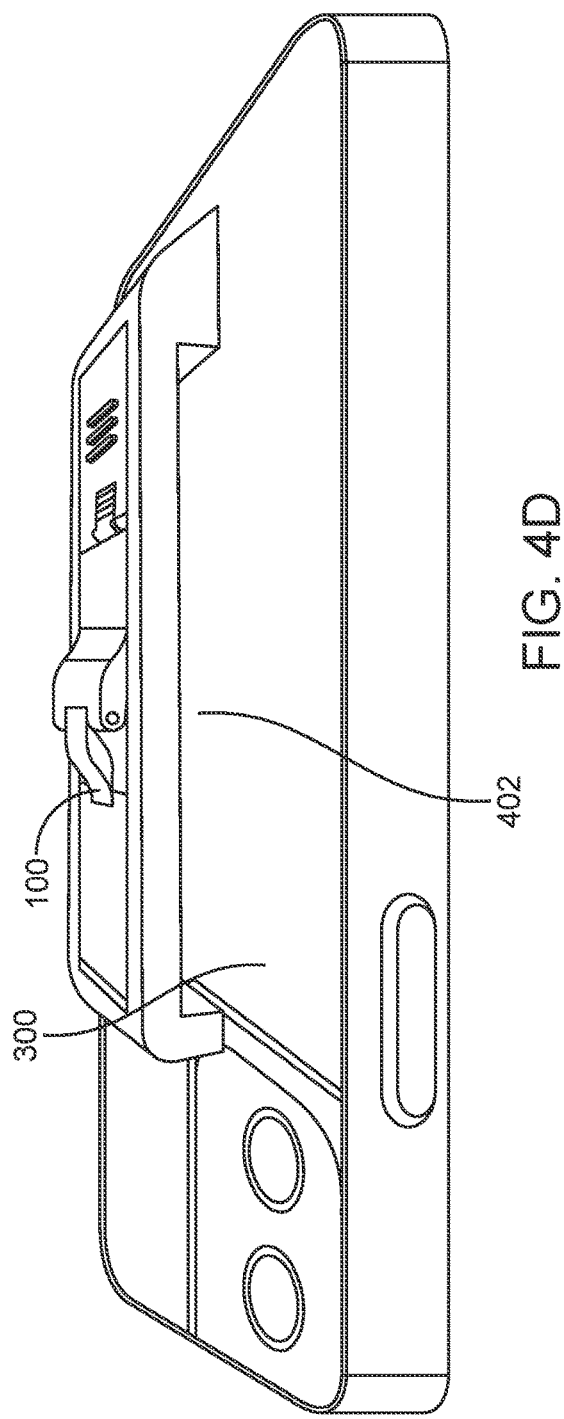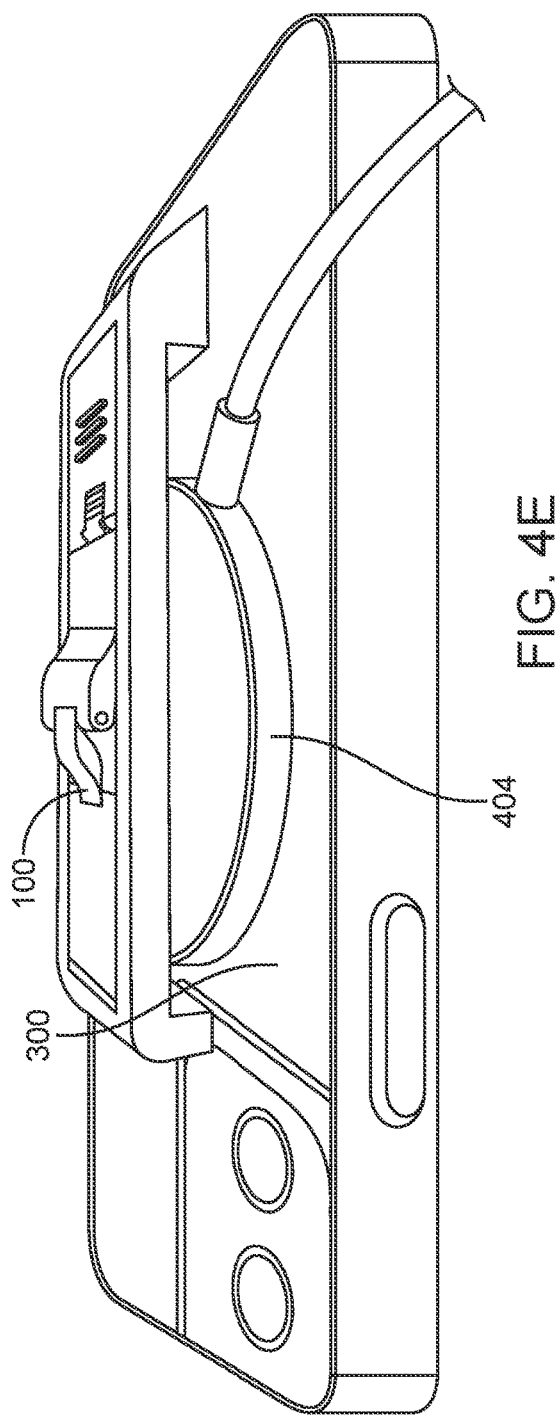

ACCESSORY FOR ELECTRONIC DEVICE

CROSS-REFERENCE TO RELATED APPLICATIONS

This application claims benefit of priority to U.S. Provisional Patent Application No. 63/155,660 filed Mar. 2, 2021, the content of which is incorporated herein by reference in its entirety.

FIELD OF THE INVENTION

The present invention relates generally to an apparatus for holding or propping up an electronic device.

BACKGROUND OF THE INVENTION

Mobile devices such as smartphones are used daily. These devices are often housed in protective covers or cases in order to protect the device from scratches or damage from dropping. Such cases may include designs to enable functions for mounting, restraining, or holding the device.

However, many current designs have limited versatility. For example, certain designs may not be activated using one hand, such that the user's other hand is free during deployment. Such designs may also require multiple fingers for deployment of the accessory. Other designs may comprise hinges that are difficult to pull away from the device. Further, other designs may not have the versatility to act as both a mounting apparatus and an apparatus that facilitates holding a device in the user's palm.

As such, a need exists for a more functional accessory that is versatile for both facilitating holding by the user and propping up the device on a surface. Additionally, there exists a need for an accessory that allows for quick deployment with minimal action from the user.

SUMMARY OF THE INVENTION

One variation of an accessory for use with a mobile device may comprise a frame, a first pivot plate, a second pivot plate, and a sliding plate. The first pivot plate may be coupled to the second pivot plate at a first hinge. The second pivot plate may have a nub at the first hinge. The nub may be configured to accommodate a finger of a user. The sliding plate may be coupled to the second pivot plate. The first pivot plate, the second pivot plate, and the sliding plate may be coupled to the frame.

The accessory may have an undeployed configuration in which the first pivot plate, the second pivot plate, and the sliding plate are substantially within the frame and may be aligned within a common plane. The nub may be positioned to lie outside the common plane. The accessory may have a deployed configuration in which the sliding plate is translated along the frame such that the first pivot plate and the second pivot plate flex outwardly from the frame via the first hinge. In the deployed configuration, a portion of the first pivot plate may sit within a portion of the second pivot plate at the first hinge and form a shoulder with the nub.

The sliding plate may comprise a grip portion. The grip portion may comprise a plurality of protrusions extending from the sliding plate. The sliding plate may be coupled to a first rod and a second rod. The frame may comprise an inner channel. The inner channel may be configured to receive the first rod and the second rod. The sliding plate may translate within the inner channel between the undeployed configuration and the deployed configuration.

The first pivot plate and the second pivot plate may be coupled at the first hinge by a hinge rod. The second pivot plate and the sliding plate may be coupled at a second hinge. The second hinge may have a second hinge rod. In the deployed configuration, the second pivot plate may be substantially orthogonal to the frame. The frame may comprise an adhesive. The adhesive may be configured to attach to the frame of the mobile device. The frame may comprise an opening configured to provide a space for a camera of the mobile phone when the frame is attached to the mobile device. The frame may comprise a horizontal channel on an underside of the frame. The horizontal channel may be configured to receive a charging unit for the mobile device. The accessory may comprise a base detachably coupled to the frame.

One variation of a method for using the accessory may comprise coupling the accessory to the mobile device. The method may also comprise sliding the sliding plate such that the first pivot plate and the second pivot plate may pivot towards each other via the pivot hinge. The method may also comprise positioning the nub at a surface to support the mobile device and using the mobile device.

BRIEF DESCRIPTION OF THE DRAWINGS

FIG. 4D illustrates a side view of yet another variation of the accessory coupled to an electronic device.

FIG. 4E illustrates a side view of yet another variation of the accessory coupled to an electronic device and a charging unit.

DETAILED DESCRIPTION OF THE INVENTION

Various embodiments for accessories and methods for holding or propping up a mobile device are provided herein. In general, the devices and methods may allow for ease of holding and using a mobile device or propping up a mobile device on a surface at an angle.

Figure 1A:
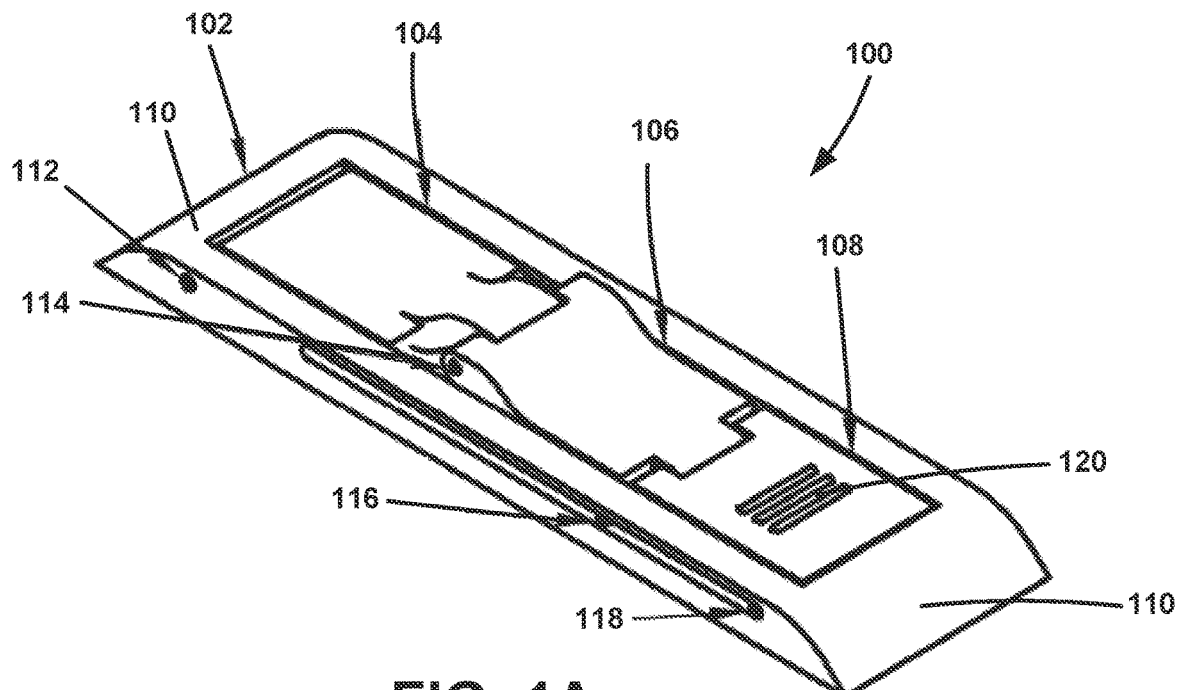
FIG. 1A illustrates a perspective view of one variation of the accessory in an undeployed configuration.

FIG. 1A illustrates a perspective view of one variation of the accessory 100 in an undeployed configuration. The accessory 100 may comprise a frame 102, a first pivot plate 104, a second pivot plate 106, and a sliding plate 108. In the undeployed configuration of the accessory 100, the frame 102 may hold the first pivot plate 104, the second pivot plate 106, and the sliding plate 108 within and substantially in line with each other along a length of the frame 102. The first pivot plate 104, the second pivot plate 106, and the sliding plate 108 may be aligned within a common plane in this configuration. The nub 128 may be positioned to lie outside of the common plane.

The plates may be coupled to the frame with one or more rods which may be coupled to frame channel 126. For instance, the first pivot plate 104 may be coupled to the frame 102 via top rod 112, the second pivot plate 106 may be coupled to the frame 102 via middle rod 116, and the sliding plate may be coupled to the frame via bottom rod 118. The frame 102 and plates may be made of plastic or any other suitable material.

Figure 1B:
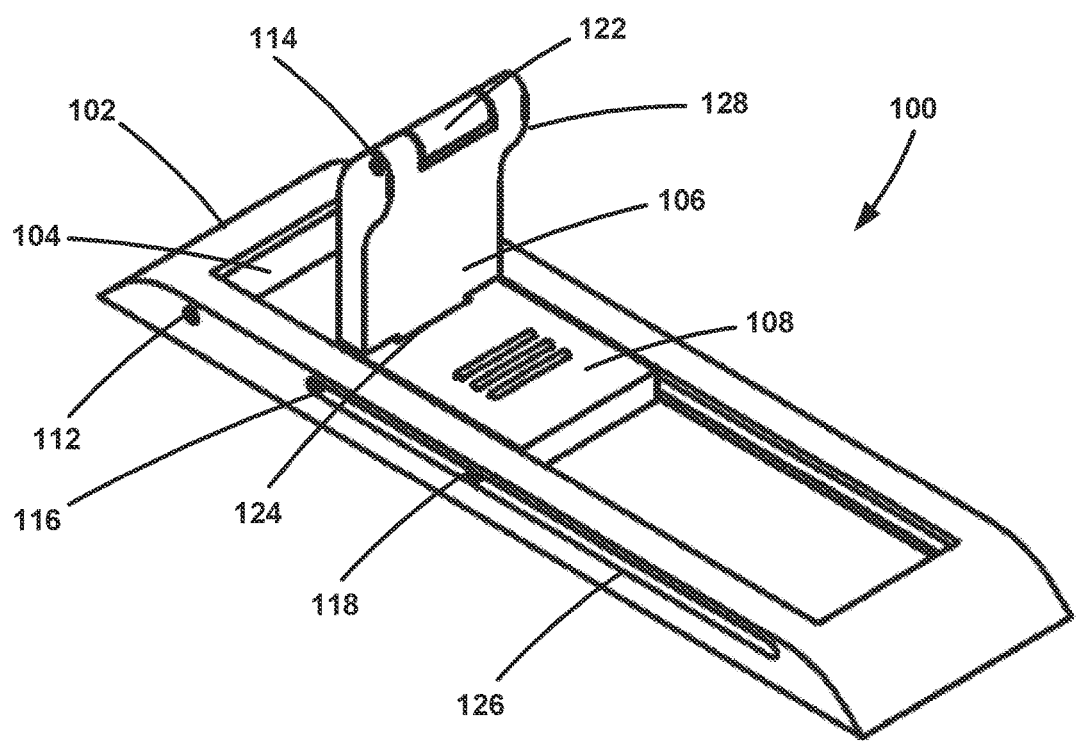
FIG. 1B illustrates a perspective view of one variation of the accessory in a deployed configuration.

FIG. 1B illustrates a perspective view of one variation of the accessory in a deployed configuration. In this configuration, the first pivot plate 104 and the second pivot plate 106 may be lifted away from the frame 102. For this configuration to be facilitated, a pivot hinge 122 may couple the first pivot plate 104 and the second pivot plate 106. The pivot hinge 122 may have a hinge rod 114 disposed within the first pivot plate 104 and the second pivot plate 106.

The pivot hinge 122 may be slightly raised from the surface of the frame 102 such that when the first pivot plate 104 and the second pivot plate 106 are pushed together, the pivot hinge 122 is lifted away from the frame 102. As such, when sliding plate 108 is translated towards first pivot plate 104 and second pivot plate 106, pivot hinge 122 may lift both first pivot plate 104 and second pivot plate 106. Movement of the sliding plate 108 may impart a force onto the first pivot plate 104 and second pivot plate 106 such that a moment is created at pivot hinge 122, transitioning the accessory 100 to the deployed configuration. Additionally, sliding hinge 124 positioned between second pivot plate 106 and sliding plate 108 may enable this motion.

The second pivot plate 106 may have a shape configured to receive a portion of first pivot plate 104. This may allow the first pivot plate 104 to partially nestle within the second pivot plate 106 in the deployed configuration. As such, the deployed configuration may be configured such that second pivot plate 106 may have a substantially orthogonal orientation in relation to the frame 102 while the first pivot plate 104 extends about 45 degrees in relation to the frame 102. Alternatively, the second pivot plate 106 may be placed any angle between the deployed configuration and the undeployed configuration in relation to the frame 102 for desired use by the user. With this configuration, pivot hinge 122 may allow the plates to slide further with respect to each other as they impart a motion that allows the plates to nestle into each other. Without this motion, the plates may stop before reaching the angle shown in FIG. 1B.

Figure 1C:
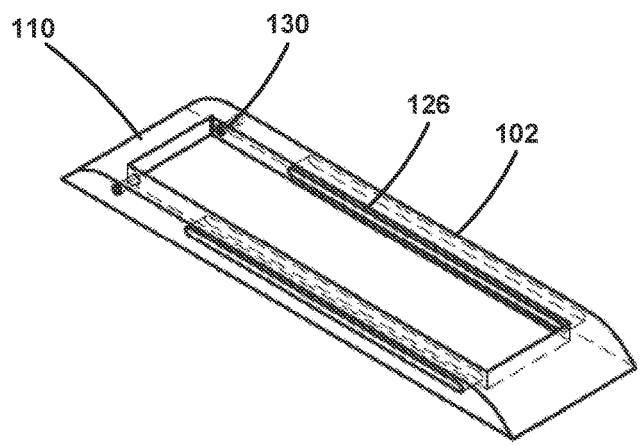
FIG. 1C illustrates a perspective view of one variation of a frame of the accessory.

FIG. 1C illustrates a perspective view of one variation of a frame 102 of the accessory. The frame 102 may have a frame channel 126 through which sliding plate 108 may translate within. To stop the sliding plate 108 at a desired point within the frame channel 126, the frame channel 126 may only extend to a certain location along the length of the frame 102. Accordingly, the location at which the sliding plate 108 stops within the frame channel 126 may be customized.

The frame 102 may comprise a top rod opening 130 embedded within. The top rod opening 130 may be configured to receive top rod 112, which may couple the first pivot plate 104 to the frame 102. To anchor the accessory 100 during deployment, first pivot plate 104 may be fixed at the location of the coupling of top rod opening 130 and top rod 112. To prevent injury to the user, the frame 102 may have curved ends 110. The frame 102 may have a length of about 90 mm, a width of about 24.6 mm, and a height of about 5 mm, though it should be understood that other suitable dimensions may be used in accordance with any electronic devices.

Figure 1D:
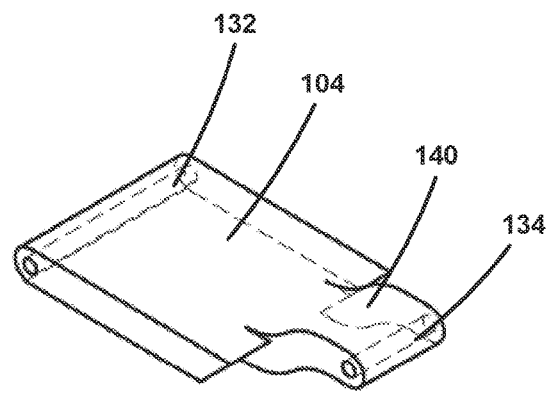
FIG. 1D illustrates a perspective view of one variation of a first pivot plate of the accessory.

FIG. 1D illustrates a perspective view of one variation of a first pivot plate of the accessory. The first pivot plate 104 may be shaped to fit within the frame 102 of the accessory 100. To allow for first pivot plate 104 to pivot from the frame 102, the width of the first pivot plate 104 may be such that the first pivot plate 104 fits within the frame while allowing pivoting at the top rod 112.

The first pivot plate 104 may comprise a top rod channel 132 configured to receive the top rod 112. To enable pivoting, top rod channel 132 may be positioned at one end of the first pivot plate 104. The first pivot plate 104 may also comprise a hinge rod channel 134 for receipt of the hinge rod 114. One end of the first pivot plate 104 may be raised outwardly from the frame 102 at a first plate hinge connector 140.

Figure 1E:
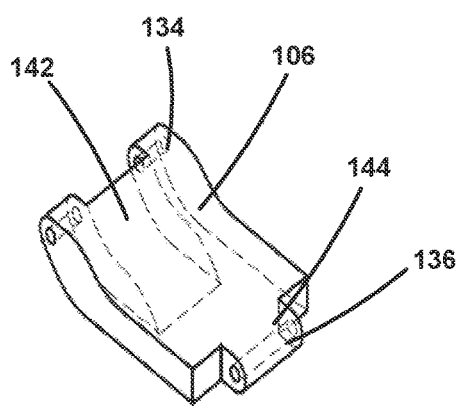
FIG. 1E illustrates a perspective view of one variation of a second pivot plate of the accessory.

FIG. 1E illustrates a perspective view of one variation of a second pivot plate of the accessory. The second pivot plate 106 may comprise a hinge rod channel 134, a second plate hinge connector 142, a first sliding connector 144, and a middle rod channel 136. The hinge rod channel 134 may pass the hinge rod 114 through the respective hinge rod channels 134 of first pivot plate 104 and second pivot plate 106. As such, the hinge rod channels 134 of the plates may be aligned such that hinge rod 114 may pass through, forming pivot hinge 122.

The second plate hinge connector 142 may be located at a raised end or nub 128 of the second pivot plate 106 with respect to the remainder of the plate. This portion of second pivot plate 106 may be a recessed portion that may receive at least a portion of the first plate hinge connector 140. When the accessory 100 is deployed, pivot hinge 122 is effectively activated and a portion of the first plate hinge connector 140 may nestle within a portion of second plate hinge connector 142. This motion may allow for the pivot hinge 122 to be lifted up smoothly during deployment as the first plate hinge connector 140 and the second plate hinge connector 142 couple to each other. As such, the first plate hinge connector 140 forms a shoulder within the nub 128. It should be considered that the first plate hinge connector 140 and the second plate hinge connector 142 may be configured as different shapes and sizes as desired.

Figure 1F:
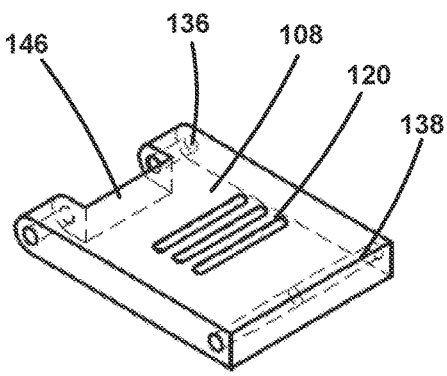
FIG. 1F illustrates a perspective view of one variation of a sliding plate of the accessory.

FIG. 1F illustrates a perspective view of one variation of a sliding plate of the accessory. The sliding plate 108 may comprise a middle rod channel 136, a second sliding connector 146, a grip portion 120, and a bottom rod channel 138. The second sliding connector 146 may couple to the first sliding connector 144 of the second pivot plate 106 via middle rod 116 disposed within the middle rod channel 136. The first sliding connector 144 and the second sliding connector 146 may be sized such that first sliding connector 144 may fit within second sliding connector 146 when assembled. As such, the middle rod channels 136 of the plates may be aligned such that middle rod 116 may pass through.

The grip portion 120 of the sliding plate 108 may comprise a plurality of protrusions on an outer surface of the plate. The protrusions may enable a user to find the sliding plate 108 for ease in deployment of the accessory. Additionally, the grip portion 120 may also provide for preventing slippage of the user's finger during deployment. It should be considered that any number or style of protrusions may be added to the sliding plate 108.

To connect the sliding plate 108 with the frame 102, the sliding plate 108 may comprise a bottom rod channel 138 located on one end of the plate. The bottom rod channel 138 may be configured for receipt of a bottom rod 118, which may pass through bottom rod channel 138 and couple to frame 102 at frame channel 126. As bottom rod 118 may slide back and forth within the frame channel 126, bottom rod 118 may not be fixed to a location within the frame channel 126. The bottom rod 118 may extend through entire bottom rod channel 138 and extend slightly past the sliding plate 108. To help strengthen the frame 102 and to provide for protection of the middle rod 116 and bottom rod 118, the outside of frame 102 may be configured such that frame channel 126 is enclosed.

Figure 2:
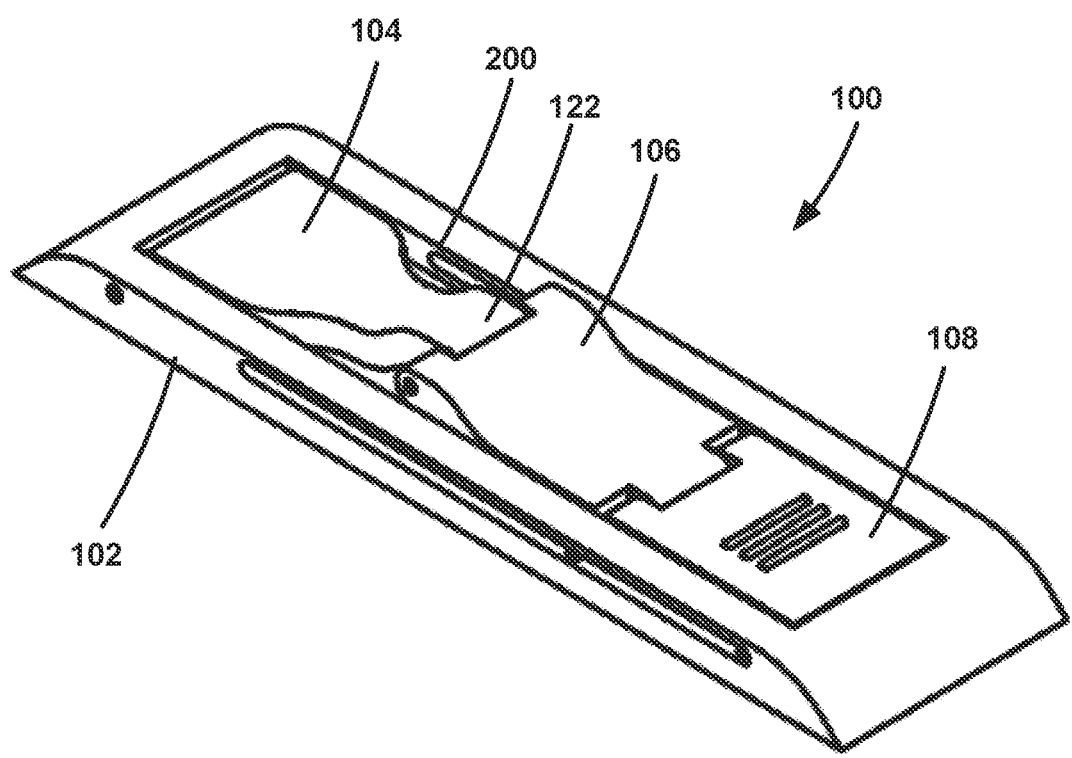
FIG. 2 illustrates a perspective view of another variation of the accessory in an undeployed configuration.

FIG. 2 illustrates a perspective view of another variation of the accessory in an undeployed configuration. This variation may comprise a first pivot plate 104 having recessed portions 200 which may be positioned towards the second pivot plate 106. The recessed portions 200 may be of any depth along the sides of first pivot plate 104 and may still allow for the lifting motion of pivot hinge 122 during deployment.

Figure 3A:
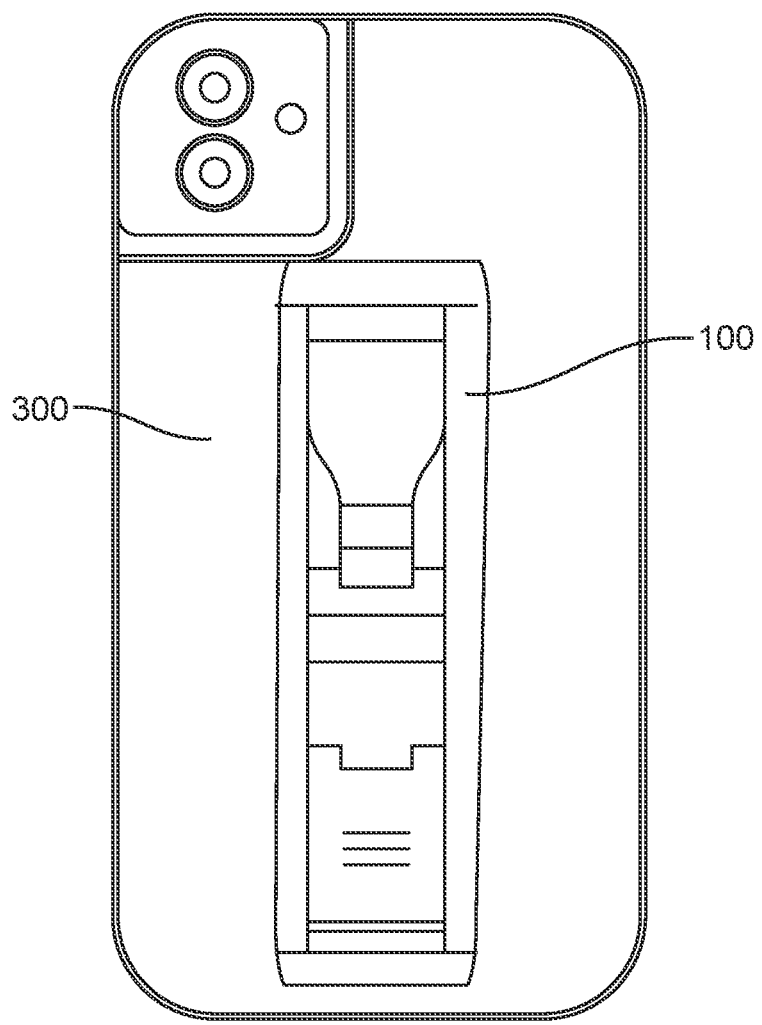
FIG. 3A illustrates a top view of another variation of the accessory coupled to an electronic device in an undeployed configuration.
Figure 3B:
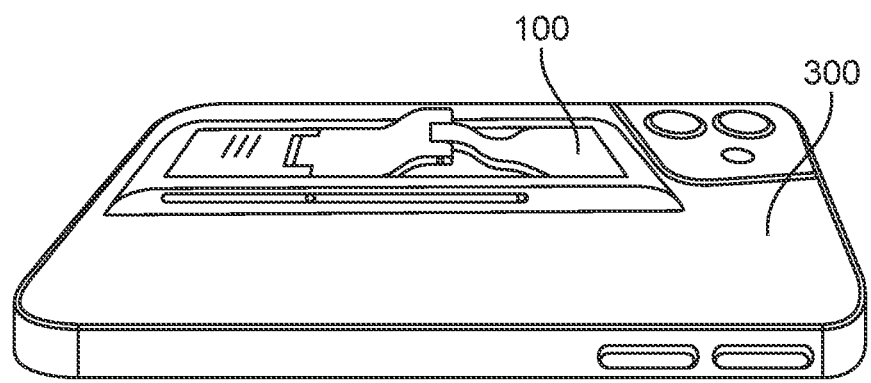
FIG. 3B illustrates a side view of another variation of the accessory coupled to an electronic device in an undeployed configuration.

FIGS. 3A and 3B illustrate top and side views of another variation of the accessory coupled to an electronic device in an undeployed configuration. The accessory 100 may be attached to a mobile device 300 or a case of the mobile device 300 using an adhesive or any other suitable attachment means. The accessory 100 may be placed on the back side of the mobile device 300 and may be held by the user such that the user may view a screen of the mobile device 300.

Figure 3C:
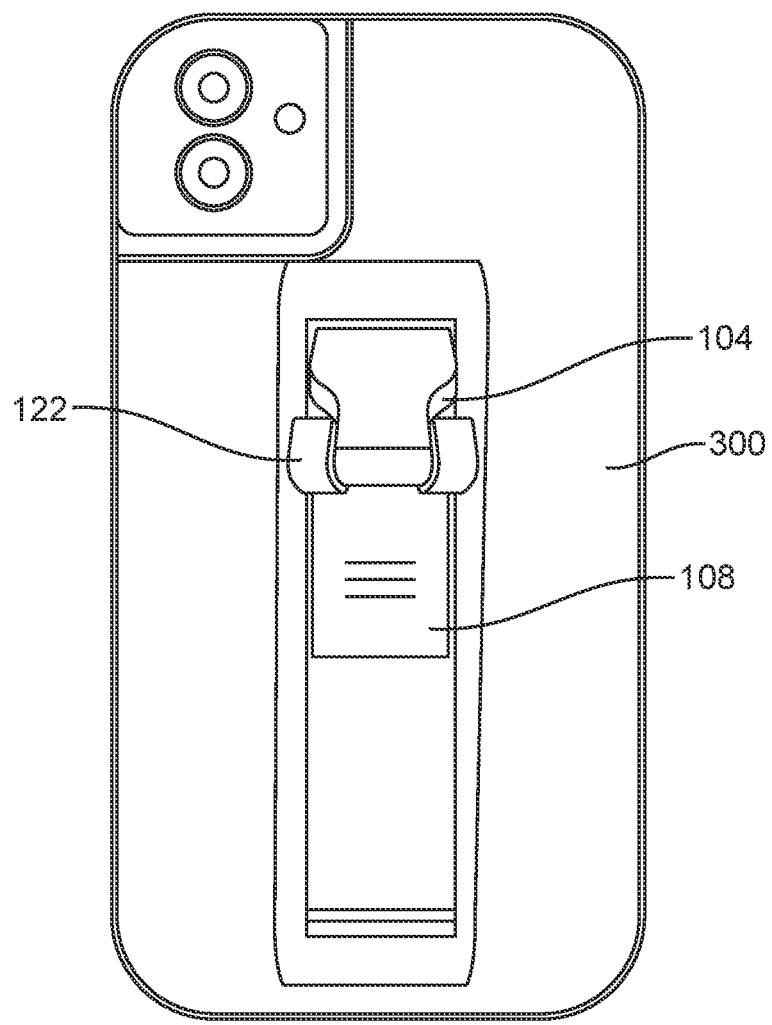
FIG. 3C illustrates a top view of another variation of the accessory coupled to an electronic device in a deployed configuration.
Figure 3D:
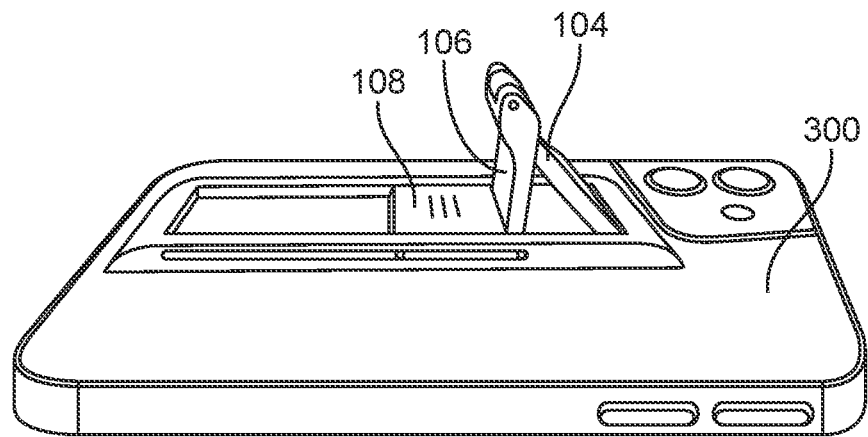
FIG. 3D illustrates a side view of another variation of the accessory coupled to an electronic device in a deployed configuration.

FIGS. 3C and 3D illustrate top and side views of another variation of the accessory coupled to an electronic device in a deployed configuration. As can be seen in FIG. 3D, the accessory 100 in the deployed configuration may comprise wherein the second pivot plate 106 is substantially orthogonal to the frame.

Figures 3E, 3F:
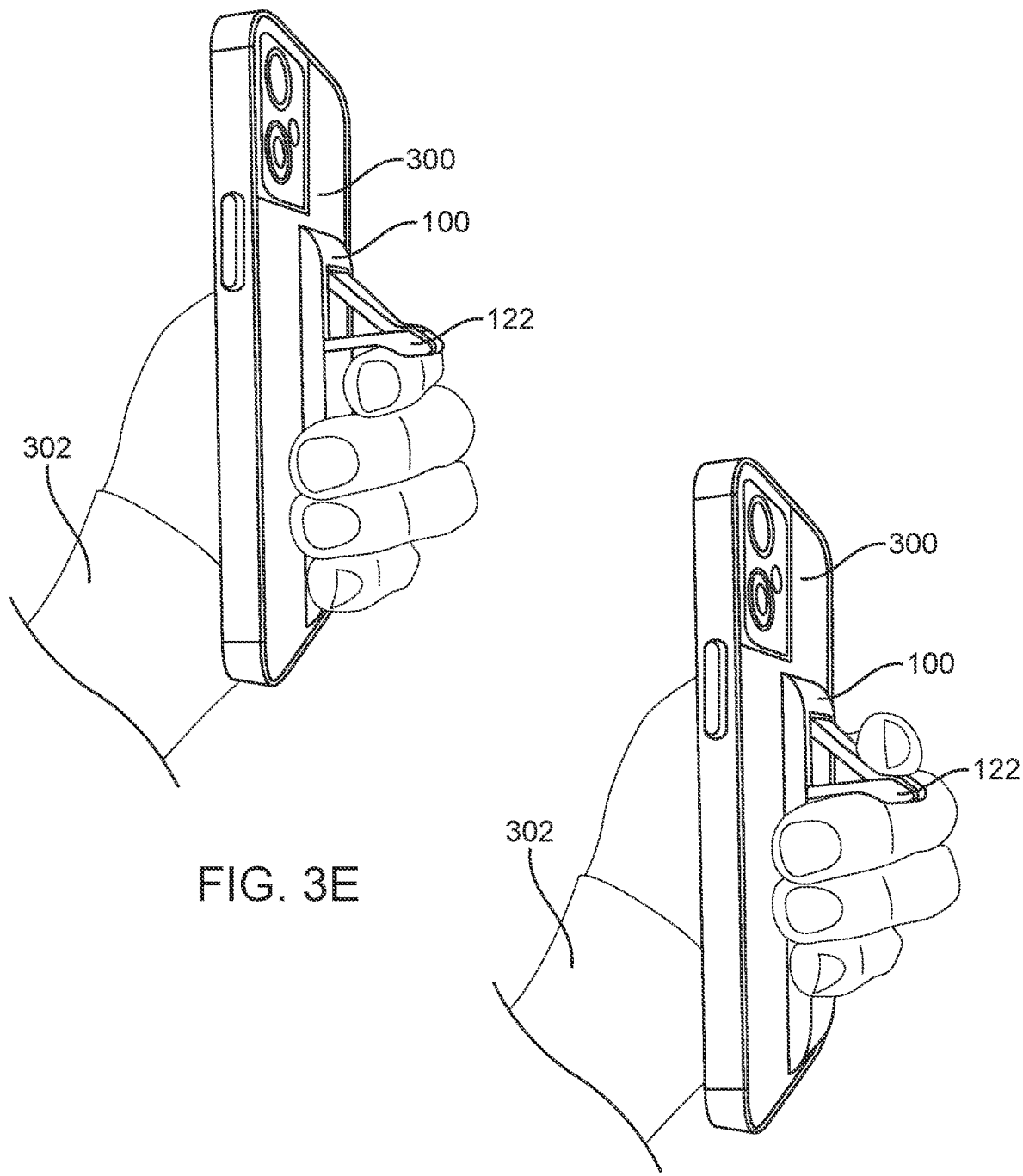
FIGS. 3E and 3F illustrate perspective views of another variation of the accessory coupled to an electronic device in a deployed configuration in the hand of a user.

FIGS. 3E and 3F illustrate perspective views of another variation of the accessory coupled to an electronic device in a deployed configuration in the hand of a user. The angle of the second pivot plate 106 in relation to the frame 102 may allow for a leveled and comfortable viewing experience for the user 302 when the user is holding the mobile device 300.

As seen in FIG. 3E, the user 302 may hold the mobile device 300 with their hand substantially under pivot hinge 122. Alternatively, as seen in FIG. 3F, the user 302 may hold the mobile device 300 with fingers positioned both over and under pivot hinge 122.

Figure 3G:
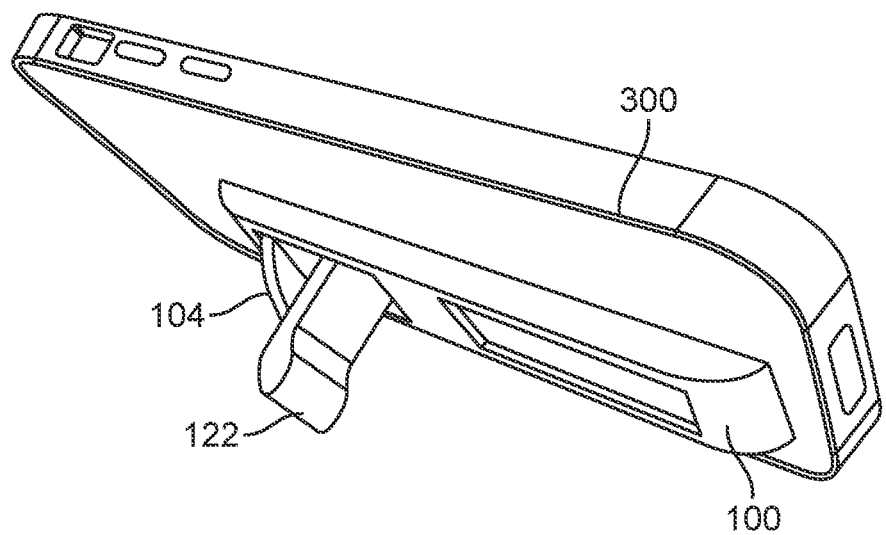
FIGS. 3G and 3H illustrate perspective views of another variation of the accessory coupled to an electronic device in a deployed configuration propped up on a surface.
Figure 3H:
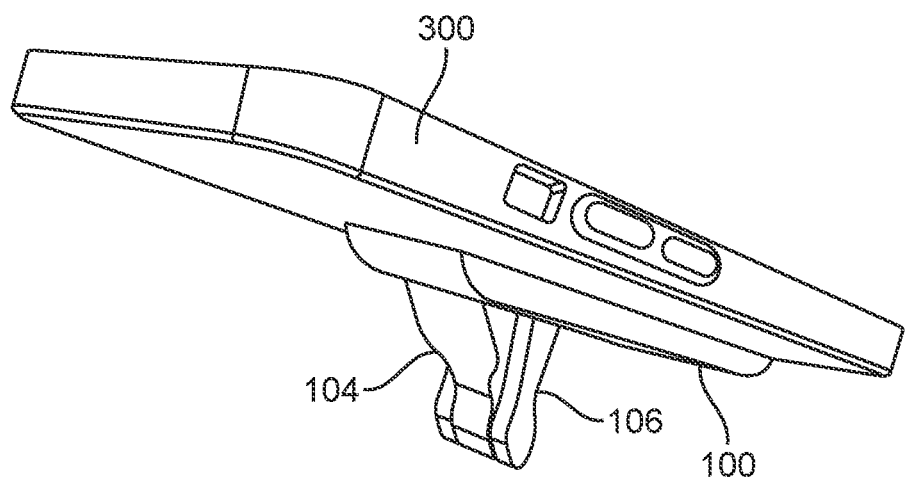

FIGS. 3G and 3H illustrate perspective views of another variation of the accessory coupled to an electronic device in a deployed configuration propped up on a surface. In the deployed configuration, the accessory 100 may be propped up on a surface such that a user may view the screen of the mobile device 300 without the user of their hands. To prop the accessory 100 on a surface, pivot hinge 122 and the mobile device 300 may contact the surface such that the device displays at an angle to the user.

Figure 4A:
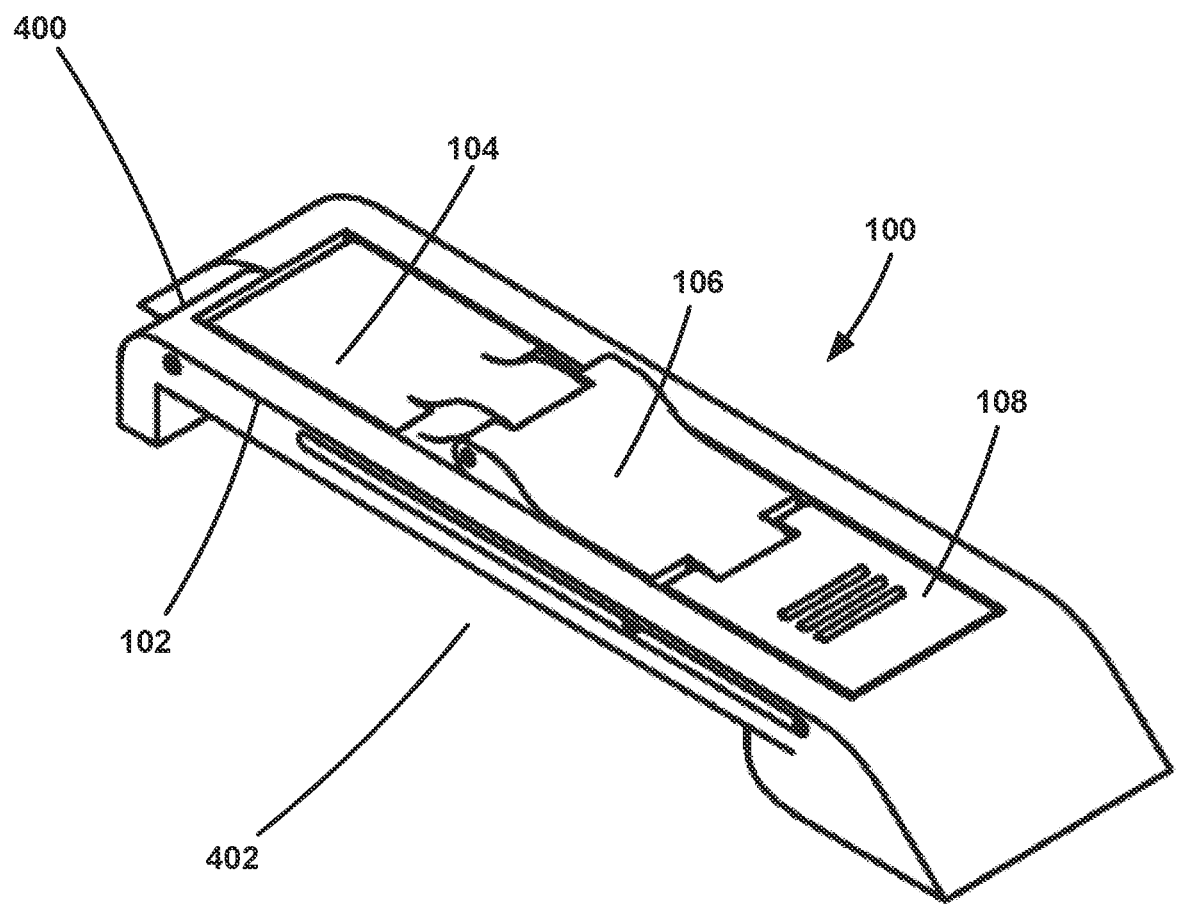
FIG. 4A illustrates a perspective view of yet another variation of the accessory in an undeployed configuration.

FIG. 4A illustrates a perspective view of yet another variation of the accessory in an undeployed configuration. In this variation, a corner opening 400 may be located at a corner of the frame 102, for example, for the purpose of enabling visibility of a camera lens of the mobile device 300. It should be understood that corner opening 400 may be shaped or positioned as desired to match features for various electronic devices. This variation of accessory 100 may also comprise a horizontal channel 402 along a back side of the frame. An accessory 100 with the horizontal channel 402 may allow for space for other accessories under the frame 102 as desired.

Figure 4B:
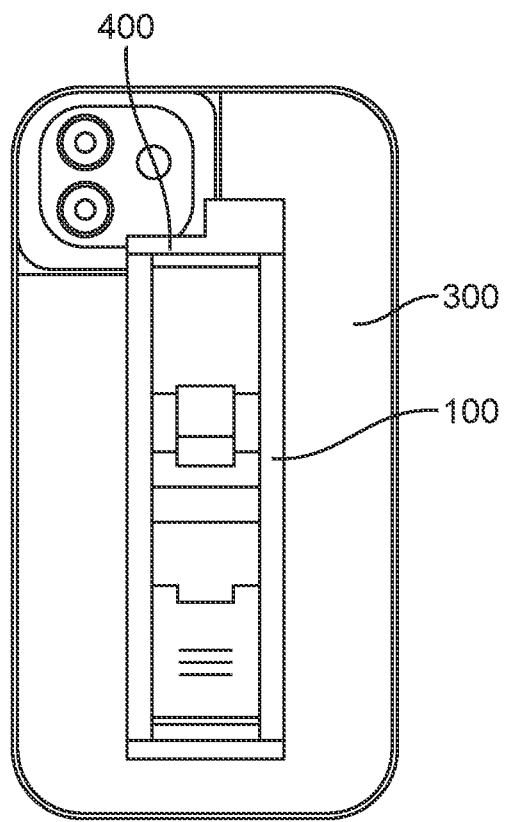
FIG. 4B illustrates a top view of yet another variation of the accessory coupled to an electronic device.
Figure 4C:
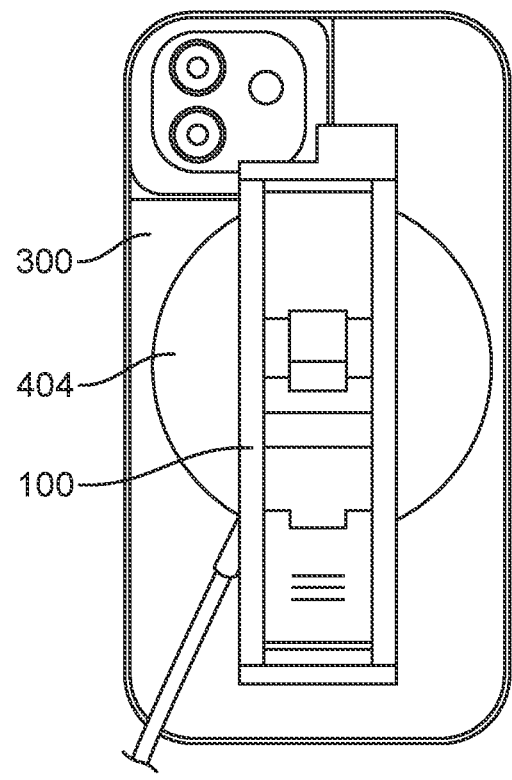
FIG. 4C illustrates a top view of yet another variation of the accessory coupled to an electronic device and a charging unit.

FIGS. 4B and 4C illustrate top views of yet another variation of the accessory coupled to an electronic device and a charging unit. As seen in FIG. 4B, the corner opening 400 of the frame 102 may be positioned to allow space for a camera or another feature of the mobile device 300. The accessory 100 may be attached to the mobile device 300 or a case of the mobile device 300 using an adhesive or any other suitable attachment means.

FIGS. 4D and 4E illustrate side views of yet another variation of the accessory coupled to an electronic device and a charging unit. In this variation, a charging unit 404 may be placed within the horizontal channel 402 and between the frame 102 and the mobile device 300 to power the device. The charging unit 404 may fit snug within the horizontal channel 402 or may rest within the horizontal channel 402 such that the user may remove or insert the charging unit 404 within the channel. Alternatively, the charging unit may be accommodated via a rotating mechanism that pivots the accessory 100.

Figure 5A:
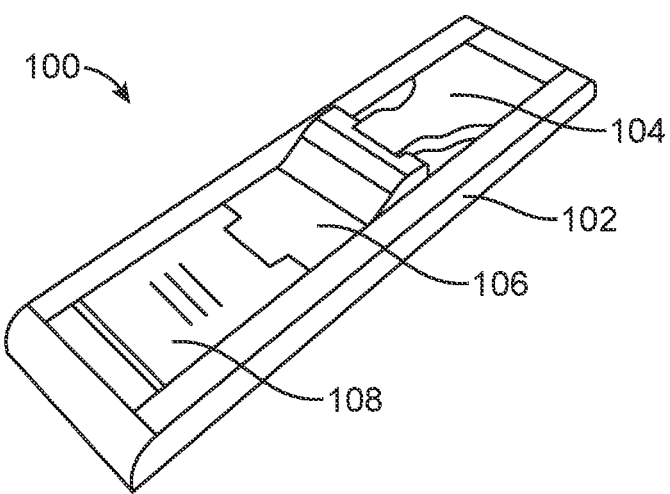
FIG. 5A illustrates a perspective view of yet another variation of the accessory in an undeployed configuration.
Figures 5B, 5C:
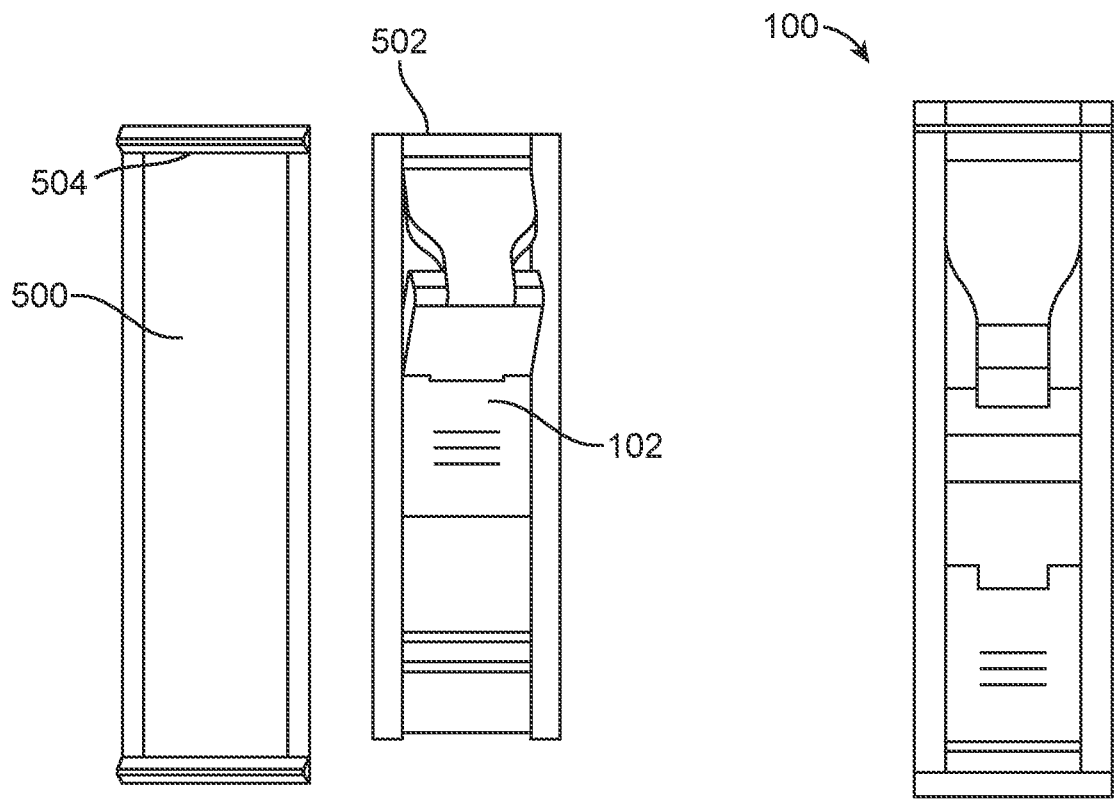
FIG. 5B illustrates a top view of yet another variation of the accessory having detachable features.
FIG. 5C illustrates a top view of yet another variation of the accessory.

FIGS. 5A to 5C illustrate views of yet another variation of the accessory. In this variation, frame 102 of accessory 100 may detachably couple to a base 500. Base 500 may be attached to a mobile device using an adhesive or any other suitable attachment means. The frame 102 may have a protrusion 502 along a top portion of the frame. The base 500 may have an indentation 504 along a top portion of the base 500. The protrusion 502 may fit within the indentation 504 to attach frame 102 to base 500. It should be understood that the frame 102 and the base 500 may be detachably coupled via any other suitable mechanism. As seen in FIG. 5B, while base 500 remains secured to the mobile device, the frame 102 may be detached from base 500 to provide a space for a wireless or a wired charging unit (e.g., charging unit 404) which may be positioned or placed in proximity to or directly upon the base 500. Once the charging of the mobile device has been completed, the frame 102 may be reattached or otherwise resecured to the base 500 for continued use.

While illustrative examples are described above, it will be apparent to one skilled in the art that various changes and modifications may be made therein. Moreover, various apparatus or procedures described above are also intended to be utilized in combination with one another, as practicable. The appended claims are intended to cover all such changes and modifications that fall within the true spirit and scope of the invention.

What is claimed is:

1. An accessory for use with a mobile device, the accessory comprising:
    a frame extending along a longitudinal axis;
    a first pivot plate;
    a second pivot plate coupled to the first pivot plate at a first hinge, the second pivot plate having a nub at the first hinge, the nub configured to accommodate a finger of a user, wherein the nub is asymmetrical with respect to a plane extending axial to the longitudinal axis;
    a sliding plate coupled to the second pivot plate, the sliding plate coupled to a first rod and a second rod both extending across the frame, wherein the first rod extends through a first channel in the sliding plate and a first channel in the second pivot plate to couple the sliding plate and the second pivot plate, wherein the second rod extends through a second channel in the sliding plate;
    a first hinge rod, wherein the first pivot plate and the second pivot plate are coupled at the first hinge by the first hinge rod, wherein the hinge rod extends through a first hinge rod channel in the first pivot plate and a second hinge rod channel in the second pivot plate, wherein the first hinge rod channel and the second hinge rod channel align such that the hinge rod is configured to extend through the first hinge rod channel and the second hinge rod channel;
    wherein the first pivot plate, the second pivot plate, and the sliding plate are coupled to the frame, wherein the second pivot plate is between the first pivot plate and the sliding plate;
    wherein the accessory has a undeployed configuration in which the first pivot plate, the second pivot plate, and the sliding plate are substantially within the frame and are aligned within a common plane and where the nub is positioned to lie outside the common plane; and
    wherein the accessory has a deployed configuration in which the sliding plate is translated along the frame such that the first pivot plate and the second pivot plate flex outwardly from the frame via the first hinge;
    wherein in the deployed configuration, a portion of the first pivot plate sits within a portion of the second pivot plate at the first hinge and forms a shoulder with the nub.

2. The accessory of claim 1, wherein the sliding plate comprises a grip portion, wherein the grip portion comprises a plurality of protrusions extending from the sliding plate.

3. The accessory of claim 1, wherein the frame comprises an inner channel, wherein the inner channel is configured to receive the first rod and the second rod, wherein the sliding plate translates within the inner channel between the undeployed configuration and the deployed configuration.

4. The accessory of claim 1, wherein in the deployed configuration, the second pivot plate is substantially orthogonal to the frame.

5. The accessory of claim 1, wherein the frame comprises an adhesive configured to attach to the frame to the mobile device.

6. The accessory of claim 1, wherein the frame comprises an opening, wherein the opening is configured to provide a space for a camera of the mobile device when the frame is attached to the mobile device.

7. The accessory of claim 1, wherein the frame comprises a horizontal channel on an underside of the frame, wherein the horizontal channel is configured to receive a charging unit for the mobile device.

8. The accessory of claim 1, further comprising a base, wherein the frame is detachably coupled from the base.

9. A method of use for the accessory of claim 1, the method comprising the steps of:
    coupling the accessory to the mobile device;
    sliding the sliding plate such that the first pivot plate and the second pivot plate pivot towards each other via the pivot hinge;
    positioning the nub at a surface to support the mobile device; and
    using the mobile device.

* * * * *